F. F. DAVIDSON.
WHEEL.
APPLICATION FILED JULY 25, 1916.
1,261,908. Patented Apr. 9, 1918.
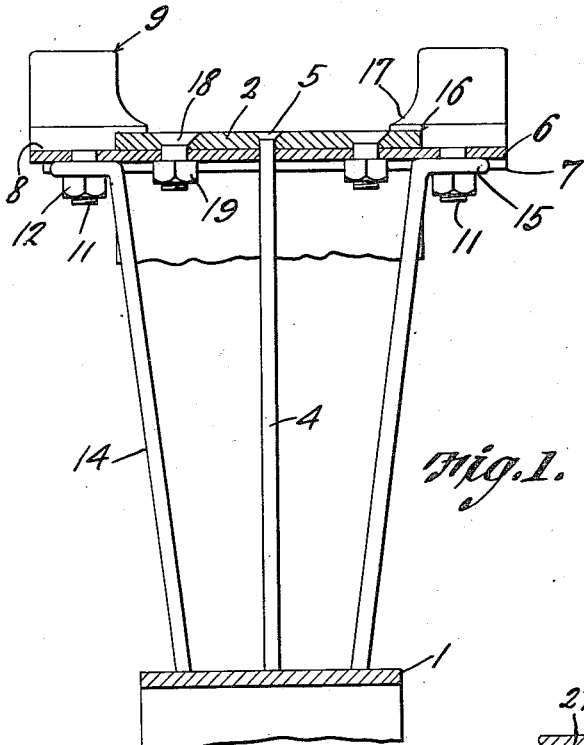
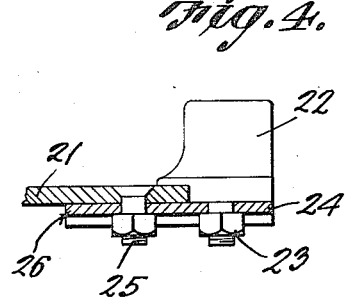
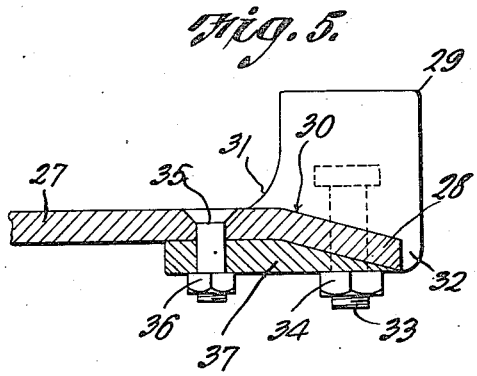
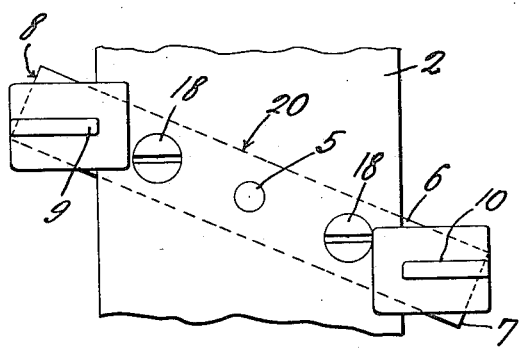
Witnesses
F. F. Davidson, Inventor
by C. A. Snow & Co.
Attorneys

UNITED STATES PATENT OFFICE.

FRANKLIN F. DAVIDSON, OF SUPERIOR, WISCONSIN.

WHEEL.

1,261,908.
Specification of Letters Patent.
Patented Apr. 9, 1918.

Application filed July 25, 1916. Serial No. 111,270.

*To all whom it may concern:*

Be it known that I, FRANKLIN F. DAVIDSON, a citizen of the United States, residing at Superior, in the county of Douglas and State of Wisconsin, have invented a new and useful Wheel, of which the following is a specification.

The device forming the subject matter of this application is a traction wheel, and one object of the invention is to provide a structure of this kind which will not ball up with mud.

Another object of the invention is to provide a traction wheel which will be practically self-cleaning.

A further object is to provide a wheel with lugs extending past the rim of the wheel, leaving the surface of the wheel smooth and unobstructed to permit the use of a scraper for cleaning the wheel.

Another object of the inventon is to provide novel means whereby the traction cleats may be assembled with the rim of the wheel so as to project beyond the lateral edges of the rim of the wheel, the traction cleats being spaced from each other circumferentially of the wheel, thereby to permit mud to pass radially across the side edges of the rim toward the center of the wheel, thereby avoiding a balling or a clogging up of the wheel.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in transverse section, a portion of a wheel embodying the present invention, parts appearing in elevation;

Fig. 2 is a fragmental top plan showing a wheel constructed in accordance with the present invention;

Fig. 3 is an elevation showing one of the traction cleats;

Fig. 4 is a fragmental transverse section showing a modified form of the invention; and Fig. 5 is a fragmental transverse section showing a modified form of the invention.

The device forming the subject matter of this application preferably is fashioned from metal throughout.

In the accompanying drawings, the numeral 1 indicates a hub. At 2 there is shown a rim. The rim 2 may be united with the hub 1 in any suitable manner, as by means of spokes 4 connected with the hub 1, and connected as indicated at 5 with the rim 2.

Applied to the inner surface of the rim 2 and spaced from each other circumferentially of the wheel are cross bars 6 which may be angle members, having inwardly projecting flanges 7. The cross bars 6 may be secured to the rim 2 by means of bolts 18 and nuts 19, or in any other desired manner. As shown in Fig. 2, and as indicated at 20, the cross bars 6 are acutely disposed with respect to the median plane of the wheel, but this construction is not insisted upon, since, if desired, the cross bars 6 may be placed at right angles to the median plane of the wheel. The cross bars 6 project, as indicated at 8, beyond the side edges of the rim 2.

Superposed on the laterally projecting ends 8 of the cross bars 6 are cleats 9. The cleats 9 may be tapered as indicated at 10, or they may be of any other desired construction. The cleats 9 are provided with studs 11 which project through the ends 8 of the cross bar 6. Nuts 12 are threaded onto the studs 11. Braces 14 are assembled with the hub 1 and include outwardly projecting angularly disposed eyes 15. The eyes 15, preferably, fill the space between the flanges 7 on the cross bar 6 circumferentially of the wheel. The studs 11 pass through the eyes 15, and the nuts 12 engage the eyes as clearly shown in Fig. 1. The braces 14 may be omitted if desired. The cleats 9 are recessed as shown at 16 to receive the lateral edges of the rim 2, and to define shoulders 17 which overhang the outer surface of the rim 2. Owing to the fact that the cleats 9 are recessed as shown at 16 to receive the edges of the rim 2, the cleats cannot rotate with the studs 11 as centers of rotation.

The cleats 9 project laterally beyond the side edges of the rim 2 and are spaced circumferentially of the rim. Consequently, the dirt can pass inwardly toward the hub 1, between adjacent cleats 9, and a balling up of the wheel will thereby be prevented.

In the modification shown in Fig. 4, the rim appears at 21 and one of the cleats is shown at 22. The cleats are held by nuts and studs 23 to a channel-shaped cross bar 24 attached by bolts 25 or otherwise to the rim 21. In this form of the invention, the only modification contemplated is that the cross bars 24 do not extend entirely across the rim, like the cross bars 3, but are terminated between the side edges of the rim, as shown at 26.

In Fig. 5, the rim appears at 27, its outer edge being inclined as shown at 28, toward the center of the wheel, to enhance the hold of the rim on the ground. One of the traction cleats appears at 29 and is inclined as shown at 30 to correspond with the inclined portion 28 of the rim 27. Each traction cleat 29 has a shoulder 31 overlapping the horizontal portion of the rim 27, each cleat being provided with an inwardly projecting finger 32 which engages the outer edge of the part 28. The studs 33 may be cast into the traction cleats 29, the studs carrying nuts 34. By means of bolts 35 carrying nuts 36, a cross bar 37 may be secured to the rim 27, the stud 33 passing through the cross bar near to the outer end thereof.

From the foregoing it will be observed that there is provided in this application, a novel means for assembling a traction cleat with a wheel, the application disclosing, also, a traction wheel which will not ball up readily. The wheel forming the subject matter of this application is adapted to be used on vehicles, agricultural machines and the like.

Having thus described the invention, what is claimed is:—

A traction wheel embodying a rim; a cross bar applied to the under surface of the rim and projecting terminally beyond one edge of the rim; a traction cleat carried by the projecting terminal portion of the cross bar and provided on its inner side with a recess receiving said edge of the rim; a securing device connecting the cross bar with the cleat beyond said edge of the rim; and a securing device connecting the cross bar with the rim inwardly of the traction cleat.

In testimony that I claim the foregoing as my own, I have hereto affixed my signature in the presence of two witnesses.

FRANKLIN F. DAVIDSON.

Witnesses: